United States Patent
Rochoux

(10) Patent No.: US 9,097,576 B2
(45) Date of Patent: Aug. 4, 2015

(54) METHOD FOR PREDICTING TYRE RUNNING NOISE

(75) Inventor: Daniel Rochoux, La Châtre (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 610 days.

(21) Appl. No.: 13/386,785

(22) PCT Filed: Jul. 19, 2010

(86) PCT No.: PCT/FR2010/051515
§ 371 (c)(1),
(2), (4) Date: Mar. 2, 2012

(87) PCT Pub. No.: WO2011/012793
PCT Pub. Date: Feb. 3, 2011

(65) Prior Publication Data
US 2012/0158383 A1     Jun. 21, 2012

(30) Foreign Application Priority Data
Jul. 28, 2009    (FR) ...................................... 09 55276

(51) Int. Cl.
*G06G 7/48*     (2006.01)
*G06F 17/10*    (2006.01)
(Continued)

(52) U.S. Cl.
CPC .............. *G01H 17/00* (2013.01); *B60C 99/006* (2013.04); *G01M 17/02* (2013.01)

(58) Field of Classification Search
CPC ... G06F 17/5095; G01H 17/00; B60C 99/006
USPC ............................................................ 703/8
See application file for complete search history.

(56) References Cited

U.S. PATENT DOCUMENTS 3,864,967 A * 2/1975 Krenzel ........................ 73/146
4,727,501 A * 2/1988 Parker et al. ................... 703/6
(Continued)

FOREIGN PATENT DOCUMENTS

JP    9-288002 A    11/1997
JP    2000-241309 A    9/2000
(Continued)

OTHER PUBLICATIONS

Hysteretic Friction for an Array of Projections by Roger James Pinnington—44 Pages, 2004.*
(Continued)

*Primary Examiner* — Akash Saxena
(74) *Attorney, Agent, or Firm* — Fitzpatrick, Cella, Harper & Scinto

(57) ABSTRACT

In a method for predicting a rolling noise B of a tire on a pavement, a real profile of the pavement is charted, at least one value of at least one descriptor of the pavement is determined based on the real profile, and use is made of a law for predicting rolling noise B of a tire. The law is of a type given by $B=g(V_1, \ldots, V_n)$, where $V_1, \ldots, V_n$ are values of descriptors $D_1, \ldots, D_n$ of the pavement, where $1 \le n \le 2$, where $D_1$ is a characteristic number of indenters of the pavement, and where $D_2$ is a characteristic dimension of the indenters of the pavement.

15 Claims, 2 Drawing Sheets

(51) Int. Cl.
*G01M 17/02* (2006.01)
*G01H 17/00* (2006.01)
*B60C 99/00* (2006.01)

(56) References Cited

U.S. PATENT DOCUMENTS

| | | | |
|---|---|---|---|
| 5,065,618 A * | 11/1991 | Hodges et al. | 73/146 |
| 5,610,330 A * | 3/1997 | Fricke et al. | 73/146 |
| 5,880,362 A * | 3/1999 | Tang et al. | 73/146 |
| 6,077,302 A * | 6/2000 | Kumra et al. | 703/7 |
| 6,163,747 A * | 12/2000 | Matsuno | 701/80 |
| 6,192,745 B1 | 2/2001 | Tang et al. | 73/146 |
| 6,264,292 B1 * | 7/2001 | Umeno et al. | 303/196 |
| 6,430,993 B1 * | 8/2002 | Seta | 73/146 |
| 6,435,014 B1 * | 8/2002 | Palmquist et al. | 73/104 |
| 6,529,838 B1 * | 3/2003 | Horiuchi et al. | 702/41 |
| 7,451,637 B2 * | 11/2008 | Kuwajima et al. | 73/105 |
| 8,180,605 B1 | 5/2012 | Zhu | 703/2 |
| 8,200,463 B2 * | 6/2012 | Ueda et al. | 703/8 |
| 8,452,578 B2 * | 5/2013 | Shiraishi | 703/7 |
| 2002/0177976 A1 | 11/2002 | Shiraishi | 702/183 |
| 2004/0144168 A1 * | 7/2004 | Oku | 73/146 |
| 2004/0243340 A1 * | 12/2004 | Miyamoto et al. | 702/142 |
| 2006/0005613 A1 * | 1/2006 | Kuwajima et al. | 73/104 |
| 2006/0136151 A1 * | 6/2006 | Shiraishi | 702/42 |
| 2007/0078633 A1 * | 4/2007 | Sundkvist et al. | 703/1 |
| 2007/0137290 A1 * | 6/2007 | Shiraishi | 73/146 |
| 2009/0120175 A1 * | 5/2009 | Assaf et al. | 73/114.12 |
| 2010/0299083 A1 * | 11/2010 | Jiang et al. | 702/41 |
| 2010/0305746 A1 * | 12/2010 | Shiraishi | 700/199 |
| 2012/0144910 A1 * | 6/2012 | Rochoux | 73/146 |
| 2012/0158383 A1 * | 6/2012 | Rochoux | 703/2 |
| 2012/0186324 A1 * | 7/2012 | Neugebauer et al. | 73/8 |
| 2012/0273306 A1 * | 11/2012 | Pangrazio et al. | 187/222 |
| 2013/0155061 A1 * | 6/2013 | Jahanshahi et al. | 345/419 |
| 2014/0019103 A1 * | 1/2014 | Imamura | 703/6 |
| 2014/0303905 A1 * | 10/2014 | Jo et al. | 702/33 |
| 2014/0350879 A1 * | 11/2014 | Takiguchi et al. | 702/70 |

FOREIGN PATENT DOCUMENTS

| | | |
|---|---|---|
| JP | 2007-210472 A | 8/2007 |
| JP | 2007-230458 A | 9/2007 |

OTHER PUBLICATIONS

"Definition of road roughness parameters for tire vibration noise control" by Tatsuo Fujikawa et al (Applied Acoustics 66 (2005) pp. 501-512).*

Tatsuo Fujikawa et al., "Definition of road roughness parameters for tire vibration noise control," Applied Acoustics, vol. 66, pp. 501-512 (2005).

G. Heinrich et al., "Rubber friction, treat deformation and tire traction," Wear, vol. 265, pp. 1052-1060 (2008).

J. Cesbron et al., "Numerical and experimental study of multi-contact on an elastic half-space," International Journal of Mechanical Sciences, vol. 51, pp. 33-40 (2009).

J. Cesbron et al., "Experimental study of tyre/road contact forces in rolling conditions for noise prediction," Journal of Sound and Vibration, vol. 320, pp. 125-144 (2009).

M. Brinkmeier et al., "A finite element approach for the simulation of tire rolling noise," Journal of Sound and Vibration, vol. 309, pp. 20-39 (2008).

* cited by examiner

METHOD FOR PREDICTING TYRE RUNNING NOISE

FIELD OF THE INVENTION

The present invention relates to the technical field of tyres and more particularly to that of the rolling noise of a tyre on a roadway pavement.

BACKGROUND

A method of predicting rolling noise of a tyre on a roadway pavement is known from the prior art. In this method, a three-dimensional real profile of the pavement is acquired. The real profile comprises indenters formed by pebbles or gravel chippings incorporated within a matrix, for example tar.

In order to simplify the use of the real profile acquired, real descriptors of the real indenters are determined comprising, for example, a mean height of the indenters, a mean density of the indenters, etc.

Next, a law for predicting the rolling noise of the tyre is used. The law is dependent on numerous descriptors adopted as relevant in regard to the rolling noise. This law is determined by correlation between empirical laws for predicting noise and determined descriptors. The law is therefore of an essentially correlative nature.

Now, the significant number of descriptors on which the law is dependent does not allow fast calculation of the predicted noise. Furthermore, certain descriptors are obtained on the basis of complex calculation tables or of systems of numerical equations that are relatively lengthy to solve.

Finally, the descriptors adopted are not always relevant for describing the physical reality of the physical interaction effect between the pavement and the tyre. These descriptors are therefore calculated needlessly without improving the accuracy of the predicted noise. Furthermore, the relationship between the noise and the descriptors of the pavement is not clearly established.

All these drawbacks lead to the use of a method that is lengthy in terms of measurement and calculation times and mediocre in terms of accuracy of the predicted noise.

SUMMARY OF THE INVENTION

The aim of the invention is to identify the type of the descriptor or descriptors as well as the descriptor or descriptors that are relevant and necessary for accurate and simple prediction of the rolling noise of the tyre.

For this purpose, the subject of the invention is a method for predicting rolling noise of a tyre on a pavement, in which:
- a real profile of the pavement is charted,
- at least one value of at least one descriptor of the pavement is determined on the basis of the real profile,
- use is made of a law for predicting the rolling noise of the tyre of the type $B=g(V_1, \ldots, V_n)$ in which $V_1, \ldots, V_n$ are values of descriptors $D_1, \ldots, D_n$ of the pavement, and in which $1 \leq n \leq 2$ and
  $D_1$ is a characteristic number of indenters of the pavement, and
  $D_2$ is a characteristic dimension of indenters of the pavement.

The inventors have found, surprisingly, that the two descriptors of the pavement $D_1$ and $D_2$ alone were relevant for accurately predicting rolling noise. Thus, a descriptor of numerary type, $D_1$, and a descriptor of dimensional type, $D_2$, make it possible to predict the rolling noise in a simple manner. Furthermore, they have discovered that the characteristic number of indenters of the pavement had a more significant influence than the characteristic dimension, so much so that, in the case where n=1, the characteristic number of indenters alone makes it possible to predict the rolling noise.

Such a prediction law is particularly advantageous for the design of a pavement. Indeed, instead of measuring the rolling noise experimentally, for example by means of sound sensors, on a roadway paved with the pavement, it is possible to predict the noise on the basis of a sample of the roadway of just one or a few meters. This affords a saving in the costs of construction of the roadway and of the experiment.

The rolling noise of a given tyre, rolling under given conditions, depends especially on the roughness of the pavement. This roughness causes vibrations of the tyre which generate noise. The pavement also exhibits absorption and reflection characteristics. The rolling noise varies as a function of these characteristics. The method according to the invention, having regard to its physical approach to the physical interaction effect, makes it possible to separate the contribution of each of these characteristics and, for the road designer, makes it possible to determine the characteristic or characteristics which result in a pavement being more or less noisy. Conversely, a noise measurement is global and does not make it possible to distinguish the physical mechanisms from which the noise originates. The measurement alone does not give the clear relationship between the characteristics and the rolling noise and does not allow mastery of the design of the pavement.

In a first embodiment, the noise prediction law is of the type:

$$B = 20\log\left[\left(\frac{R}{Ro}\right)^{\frac{1}{5}}\left(\frac{No}{N}\right)^{\frac{3}{5}}\left(\frac{C}{Co}\right)^{k}\left(\frac{0.75}{1-v^2}\frac{E}{Eo}\right)^{\frac{1}{5}}\right] + Bo$$

in which R is the value of the characteristic dimension of indenters, N is the value of the characteristic number of indenters, C is a rolling speed of the tyre, E is a stiffness modulus of the rubber of the tyre, v is a Poisson's ratio of the rubber of the tyre and Ro, No, Co, Eo and Bo are reference values. k belongs to the interval [1.2-2].

It is thus possible to predict the rolling noise of any tyre rolling on any pavement.

In a second embodiment, the noise prediction law is of the type:

$$B = 20\log\left[\left(\frac{R}{Ro}\right)^{\frac{1}{5}}\left(\frac{No}{N}\right)^{\frac{3}{5}}\left(\frac{C}{Co}\right)^{k}\right] + Bo'$$

in which R is the value of the characteristic dimension of indenters, N is the value of the characteristic number of indenters, C is a rolling speed of the tyre and Ro, No, Co, and Bo' are reference values. k belongs to the interval [1.2-2].

It is possible, for a given tyre, to use the law according to the second embodiment to compare several pavements with one another. Indeed, this law does not contain any term relating to the tyre.

In a third embodiment, the noise prediction law is of the type:

$$B = 20\log\left[\left(\frac{No}{N}\right)^{\frac{3}{5}}\left(\frac{C}{Co}\right)^{k}\right] + Bo''$$

in which N is the value of the characteristic number of indenters, C is a rolling speed of the tyre and No, Co, and Bo" are reference values. k belongs to the interval [1.2-2].

In a fourth embodiment, the noise prediction law is of the type:

$$B = 20\log\left[\left(\frac{No}{N}\right)^{\frac{3}{5}}\left(\frac{C}{Co}\right)^{k}\left(\frac{0.75}{1-v^2}\frac{E}{Eo}\right)^{\frac{1}{5}}\right] + Bo'''$$

in which N is the value of the characteristic number of indenters, C is a rolling speed of the tyre, E is a stiffness modulus of the rubber of the tyre, v is a Poisson's ratio of the rubber of the tyre and No, Co, Eo and Bo''' are reference values. k belongs to the interval [1.2-2].

Having regard to the power of the term relating to the characteristic dimension relative to the powers of the terms relating to the speed and to the characteristic number of indenters of the pavement, it is possible to obtain a good approximation of the rolling noise without having to determine the characteristic dimension of the indenters of the pavement by virtue of the laws of the third and fourth embodiment.

In a fifth embodiment, the noise prediction law is of the type:

$$B = 20\log\left[\left(\frac{R}{Ro}\right)^{\frac{1}{5}}\left(\frac{No}{N}\right)^{\frac{3}{5}}\right] + Bo''''$$

in which R is the value of the characteristic dimension of indenters, N is the value of the characteristic number of indenters and Bo"" is a reference value.

According to an optional characteristic of the method:
at least one law of variation of at least one descriptor of the pavement is determined on the basis of the real profile, as a function of a variable parameter of the real profile,
a so-called interaction value of each descriptor is determined at a so-called interaction value of the parameter, for each law of variation, and
a value of the rolling noise is predicted on the basis of an interaction value of at least one descriptor.

By determining the law of variation and by seeking the interaction value of each descriptor, it is thus possible to correctly describe the physical interaction effect between the pavement and the tyre and therefore the noise.

Optionally, the real profile is sectioned into several strata, each stratum corresponding to an altitude of the real profile:
a law of variation of each descriptor is determined as a function of the altitude of the real profile, and
the interaction value of each virtual descriptor is determined at the interaction value of the altitude, for each law of variation.

The variable parameter is the altitude z. The interaction value of the altitude corresponds to the profile altitude for which the squashing of the tyre at this altitude faithfully represents the real squashing of the tyre on the pavement.

Optionally:
the descriptor or descriptors comprise at least one so-called real descriptor of real indenters of the pavement;
the interaction value of each real descriptor is determined;
the value of the rolling noise is predicted on the basis of the interaction value of at least one real descriptor.

According to other optional characteristics of the method:
The real descriptor being the number of real indenters per unit area of the pavement, the value of the characteristic number of indenters is the interaction value of the number of real indenters per unit area of the pavement.
The interaction value is the maximum value of the law of variation of the number of real indenters per unit area of the pavement.

The number of indenters per unit area of pavement is calculated easily in contradistinction to the prior art noise prediction method in which several tens of descriptors must necessarily be calculated.

Optionally:
the descriptor or descriptors comprise at least one so-called virtual descriptor of virtual indenters for modelling the real indenters;
the interaction value of each virtual descriptor is determined on the basis, on the one hand, of a law of interaction between the tyre and the pavement and, on the other hand, of each law of variation of the virtual indenters, and
the value of the rolling noise is predicted on the basis of the interaction value of at least one virtual descriptor.

According to another optional characteristic of the method, the virtual indenters being represented by identical spheres for each value of the variable parameter, the virtual descriptor is the radius of the spheres and the value of the characteristic dimension is the interaction value of the radius of the spheres.

For the interaction value, each real indenter is modelled by a virtual indenter which conveys a physical reality of the interaction between the tyre and the pavement, rather than a geometric reality as in the prior art. Thus, the amount of data to be manipulated is smaller. Indeed, for each value of the parameter, the virtual indenters are all identical although the real indenters that they model are all different.

The subject of the invention is also a computer program comprising code instructions able to control the execution of the steps of the method such as defined hereinabove when it is executed on a computer.

The subject of the invention is also a medium for recording data comprising, in recorded form, a program such as defined hereinabove.

The subject of the invention is also a making available of a program such as defined hereinabove on a telecommunication network with a view to its downloading.

The subject of the invention is finally a method for manufacturing a pavement comprising a prediction step according to a method such as defined hereinabove.

BRIEF DESCRIPTION OF THE DRAWINGS

The invention will be better understood on reading the description which follows, given solely by way of nonlimiting example and while referring to the drawings in which.

DETAIL DESCRIPTION OF EMBODIMENTS OF THE INVENTION

In the figures, mutually orthogonal axes X, Y, Z corresponding to the customary longitudinal (X), transverse (Y) and vertical (Z) orientations of a roadway have been represented.

Figure 1:
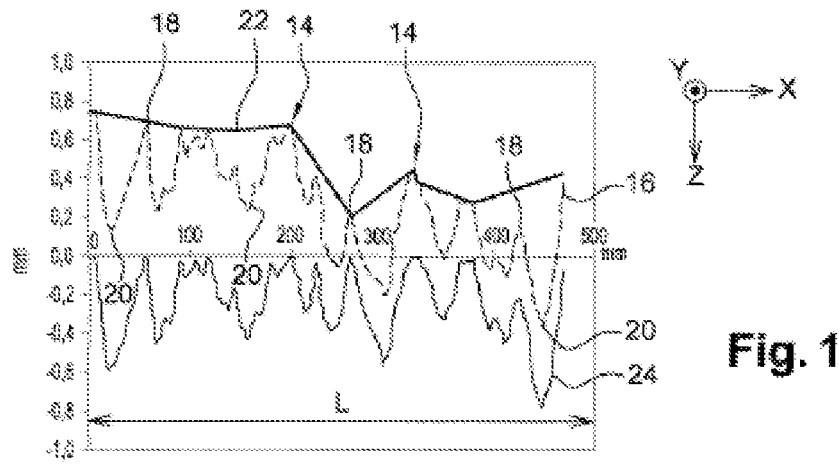
FIG. 1 represents a real profile of a roadway pavement and a filtered real profile of the pavement.
Figure 2:
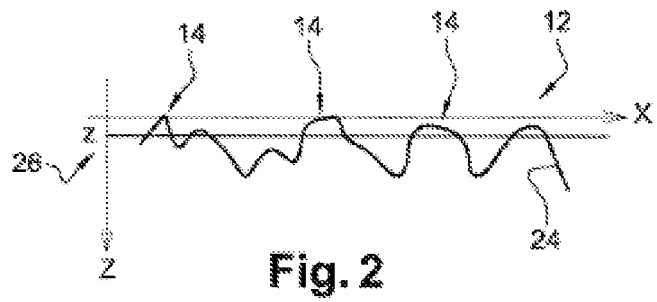
FIG. 2 illustrates a step of sectioning the real profile into strata.

A roadway pavement 12 intended to be in interaction with a tyre has been represented in FIGS. 1 and 2. The pavement 12 comprises a matrix comprising tar, bitumen and/or cement, within which gravel chippings of varying sizes are incorporated. These gravel chippings, also called grit, form indenters 14 on the surface of the pavement 12. The indenters 14 are intended to be in contact with the tyre.

The pavement 12 is manufactured according to a prediction method described hereinbelow.

A two-dimensional so-called real profile 16 of a sample of the pavement 12 is charted, preferably by means of a laser profilometer. In this instance, a depth of the real profile 16 is measured over a length L of the pavement. By acquiring a two-dimensional profile 16, the acquisition time and the hardware to be implemented is decreased with respect to the charting of a three-dimensional profile. The real profile 16 is represented in FIG. 1 in a plane X, Z by a dashed line and exhibits crests 18 and troughs 20. It is considered that each real profile 16 represents a slice of thickness dy of the pavement.

As a variant, several two-dimensional profiles 16 are charted so as to constitute a three-dimensional sample.

The profile 16 is filtered by means of a cutoff filter 22 represented by a broken line in FIG. 1 and called a crest line. The crest line 22 selects and connects the crests 18 exhibiting an altitude z such that a tyre rolling over the profile 16 enters into contact solely with the selected crests 22. Finally, the profile 16 is rectified by reinitializing the altitudes of the selected crests 22 to the zero altitude. A rectified profile 24 is then obtained, represented by a continuous line in FIG. 1.

The profile 24 has been represented in FIG. 2. The profile 24 is discretized as a function of a variable parameter of the profile 24. In this instance, the variable parameter is an altitude z of the profile 24. The profile 24 is then sectioned into several strata 26 along the Z axis, for example a hundred strata, each corresponding to an altitude z. The strata are substantially plane and parallel to the X, Y plane.

So-called real descriptors $N_R$, $\gamma_R$ and $V_R$ of the indenters 14 are defined. The index R indicates that these descriptors are measured on the basis of the real profile 24. A sectional plane of altitude z is also defined, corresponding to a horizontal plane perpendicular to the Z axis and extending at the altitude z. For each real descriptor $N_R$, $\gamma_R$ and $V_R$, a law of variation as a function of the variable parameter z will now be calculated.

Figure 3:
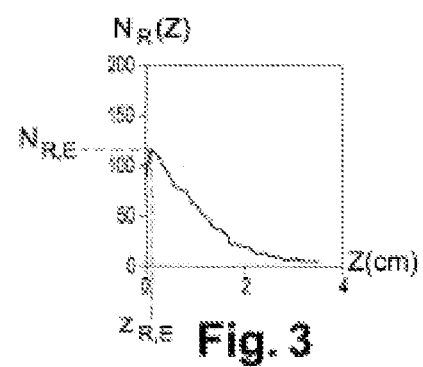
FIG. 3 represents a law of variation of the number of real indenters of the real profile as a function of an altitude z.

With reference to FIGS. 2 and 3, $N_R$ represents the number of real indenters 14 per unit area. For each altitude z, the number of indenters 14 of the profile 24 that are intercepted by each sectional plane of altitude z and per unit area is calculated. A law of variation $N_R(z)$ is then determined as a function of the variable parameter z. Next, a so-called interaction value $N_{R,E}$ is determined on the basis of the law of variation $N_R(z)$. The interaction value $N_{R,E}$ is the maximum value of the number of real indenters 14 per unit area of the pavement 12. In FIG. 3, $N_{R,E}=115$ indenters per m² for $z_{R,E}=17$ mm.

In the case of a three-dimensional profile, the number of real indenters 14 in contact with the tyre is determined for each altitude z. For one and the same slice dy of pavement, the number of real indenters 14 in contact with the tyre varies if the crests 18 are not coplanar in the slice dy considered.

In the case of a two-dimensional profile, the assumption is made according to which the maximum value of the number of real indenters 14 is the real value of the number of real indenters 14 for each altitude z. Indeed, a local maximum is generally indicative of the presence of a crest 18 along the transverse direction in the slice dy explored.

Figure 4:
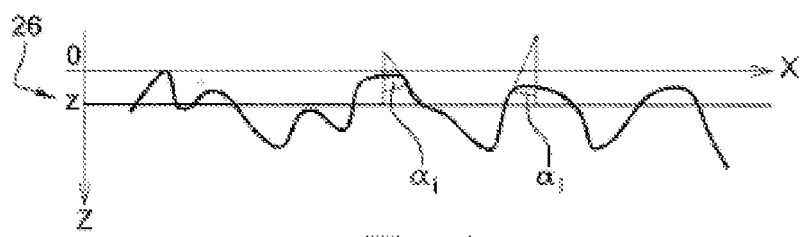
FIG. 4 illustrates a step of determining the real deformation of the tyre by the real indenters.

With reference to FIG. 4, $\gamma_R$ represents a real local deformation of the tyre by each indenter 14. For each altitude z, each deformation $\gamma_{z,i}$ is calculated, defined by $\gamma_{z,i}=\cotan(\alpha_i)$ where $\alpha_i$ is the half-angle at the apex of each indenter 14i present at the altitude z. Next, for each altitude z, a mean value of the deformations $\gamma_{z,i}$ is calculated. A law of variation $\gamma_R(z)$ is thus determined as a function of the variable parameter z.

Figure 5:
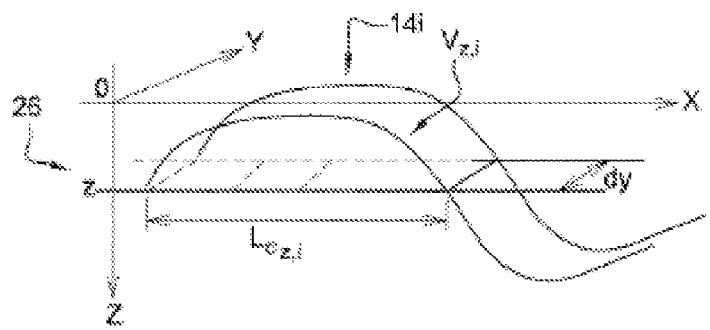
FIG. 5 illustrates a step of determining the real volume indented by the real indenters in the tyre.

With reference to FIG. 5, $V_R$ represents a real volume per unit area indented by the real indenters 14 in the tyre. For each altitude z, each volume, $\Delta V_{z,i}$, indented by each indenter 14i at the altitude z is calculated, defined by $\Delta V_{z,i}=L_{C_{z,i}} \cdot h_{m,i} \cdot dy$ where $Lc_{z,i}$ is a chord length of each indenter i at the altitude z, $h_{m,i}$ is a mean height of each indenter 14i over the length $Lc_{z,i}$. Next, $V_R(z)$ is calculated for each altitude z by adding up the volumes $\Delta V_{z,i}(z)$. A law of variation $V_R(z)$ is thus determined as a function of the variable parameter z and defined by:

$$V_{R(Z)} = \frac{1}{L \cdot dy} \cdot \Sigma \Delta V_{z,i}$$

where L represents the length of the profile 24.

Figure 6:
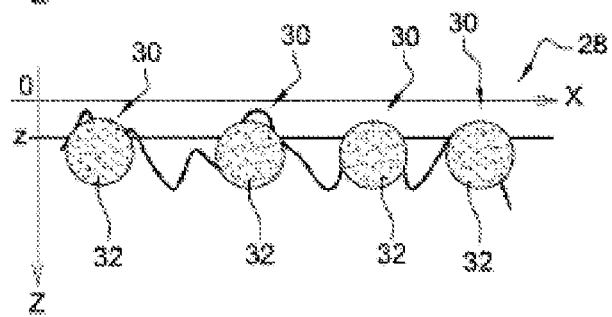
FIG. 6 illustrates a virtual profile obtained by the method according to the invention.

The pavement 12 is modelled by a virtual profile 28 represented in FIG. 6. The virtual profile 28 comprises virtual indenters 30 for modelling the real indenters 14. So-called virtual descriptors of the virtual indenters 30 are defined. Each virtual descriptor varies as a function of the variable parameter z according to a law of variation.

These virtual descriptors comprise primary virtual descriptors $a_v$, $R_v$, $h_v$, and secondary virtual descriptors $\gamma_v$, $V_v$. The index V indicates that the descriptors are virtual. The secondary virtual descriptors $\gamma_v$, $V_v$ and the real descriptors $\gamma_R$, $V_R$ describe analogous physical quantities of the interaction between the tyre and respectively the virtual indenters 30 and real indenters 14. A sectional plane of altitude z corresponding to a horizontal plane perpendicular to the Z axis and extending at the altitude z is defined for the virtual profile 28, in a manner analogous to the real profile 24.

The virtual indenters 30 are represented by spheres 32. As a variant, the virtual indenters 30 may be represented by cones, cylindrical bars or other shapes suited to the type of pavement to be modelled and to the physical interaction effect.

Figure 7:
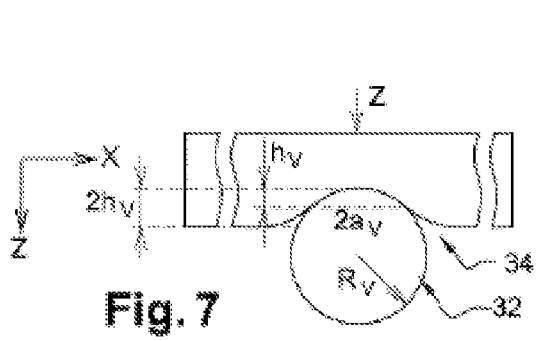
FIG. 7 represents a modelled interaction between the tyre and the pavement.

An interaction between the tyre and a virtual sphere 32 of radius $R_v$ has been represented in FIG. 7. For a load Z applied to the tyre, the sphere 32 creates an indentation of depth $2h_v$ and comprises a lenticular part 34 in contact with the tyre of maximum radius $a_v$ and of height $h_v$. The interaction between the tyre and the sphere 32 obeys a Hertz interaction law:

$$a_v = \frac{3(1-v^2) \cdot Z \cdot R_v}{4 \cdot E}$$

in which v and E are respectively the Poisson's ratio and the stiffness modulus of the rubber of the tyre.

Figure 8:
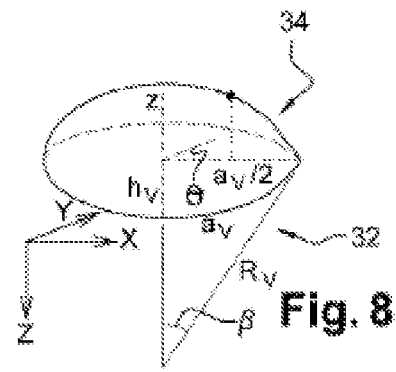
FIG. 8 illustrates a lenticular part of a sphere to which reference is made for the determination of the virtual deformation of the tyre and of the virtual volume indented by the virtual indenters in the tyre.

The lenticular part 34 of a sphere 32 of radius $R_v$ has been represented in FIG. 8. For each secondary virtual descriptor $\gamma_v$, $V_v$, each law of variation will now be calculated as a function of at least one of the primary virtual descriptors $a_v$, $R_v$, $h_v$, here as a function of $a_v$ and $R_v$.

$\gamma_v$ represents a virtual deformation of the tyre by each virtual indenter 30, here by the hemispherical part 34. The real deformation is calculated on the basis of the profile 16 of the real indenters 14 in two dimensions. The virtual deformation is calculated on the basis of the spheres 32 in three dimensions. It is therefore considered that the virtual deformation corresponds to an average of the deformations caused by each sphere 32 according to the set of X, Z planes passing through each sphere 32 as if the spheres 32 were disposed randomly along the virtual profile 28. Thus, on the basis of a real two-dimensional profile, the method makes it possible to determine tridimensional descriptors of the virtual profile.

The mean deformation corresponds, in each sectional plane X, Z, to the deformation imposed by the mid-contact point, that is to say the point with coordinates $x=(a_v \cdot \cos \theta)/2$, $y=(a_v \cdot \sin \theta)/2$. A slope at the mid-contact point is given by the relation:

$$\frac{dz}{dx} = -\frac{a_v}{2} \cdot \cos\theta \cdot [R_v^2 - \frac{a_v^2}{4} \cdot (1 - 3 \cdot \sin^2\theta)]^{\frac{1}{2}}$$

In order to obtain the virtual deformation of the tyre $\gamma_v$ over the set of sectional planes X,Z, we calculate:

$$\gamma_{m,v} = \frac{2}{\pi} \int_0^{\pi/2} -\frac{a_v}{2} \cdot \cos\theta \cdot [R_v^2 - \frac{a_v^2}{4} \cdot (1 - 3 \cdot \sin^2\theta)]^{-\frac{1}{2}} d\theta$$

A law of variation $\gamma_v(z)$ is thus determined as a function of $a_v(z)$ and $R_v(z)$ and therefore as a function of z:

$$\gamma_{m,v}(z) = \frac{a_v}{\pi \left(R_v^2 - \frac{a_v^2}{4}\right)^{\frac{1}{2}}} + \frac{1}{8\pi} \left[\frac{a_v}{\left(R_v^2 - \frac{a_v^2}{4}\right)^{\frac{1}{2}}}\right]^3$$

$V_v$ represents a virtual volume indented by the virtual indenters 30 in the tyre, here by the hemispherical part 34.

A law of variation $V_v(z)$ is thus determined as a function of $a_v(z)$ and $R_v(z)$, and therefore as a function of z, in the following manner:

$$V_v(z) = \pi \cdot R_v^3 \cdot \left(\frac{2}{3} + \frac{\cos^3\beta}{3} - \cos\beta\right)$$

with $\cos\beta = \frac{R_v - h_v}{a_v}$

Next, a value of each primary virtual descriptor $a_v(z)$, $R_v(z)$ is determined, for each value of the variable parameter z, on the basis of each law of variation of each real descriptor $\gamma_R(z)$, $V_R(z)$ and of each law of variation of each secondary virtual descriptor $\gamma_v(z)$, $V_v(z)$. In this instance, for each value of the variable parameter z, equality is established between, on the one hand, the real indented volume $V_R(z)$ and the virtual indented volume $V_v(z)$ and, on the other hand, the real deformation $\gamma_R(z)$ and the virtual deformation $\gamma_v(z)$. A law of variation of each primary virtual descriptor $a_v(z)$, $R_v(z)$ is thus determined as a function of the variable parameter z. One then speaks of a model with imposed deformation and imposed volume.

It will be noted that the virtual spheres 32 are, for each value of the variable parameter z, identical and all described by the same primary descriptors $a_v(z)$, $R_v(z)$.

Figure 9:
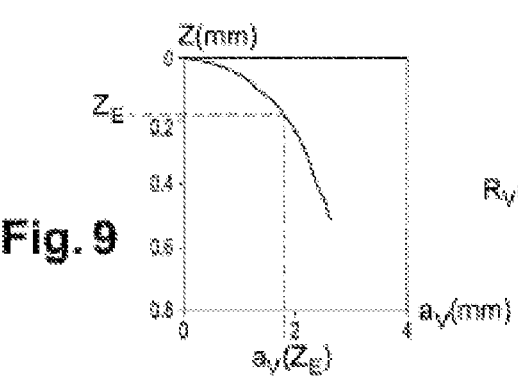
FIGS. 9 and 10 represent laws of variation of virtual descriptors as a function of the altitude z.
Figure 10:
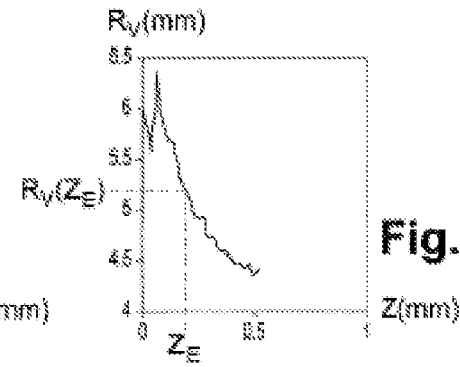

The laws of variation of the primary virtual descriptors respectively $a_v(z)$ and $R_v(z)$ with imposed deformation and imposed volume have been represented in FIGS. 9A and 9B.

A so-called interaction value of the variable parameter, here an interaction value $z_E$ of the altitude z, is then determined on the basis, on the one hand, of the Hertz law of interaction, specified hereinabove, between the tyre and the pavement and, on the other hand, of each law of variation of the primary virtual descriptors $a_v(z)$, $R_v(z)$. The system formed by these three laws is solved numerically and, in the example represented, we obtain $z_E=0.19$ mm. An interaction value of each descriptor $a_v(z)$, $R_v(z)$ at the interaction value $z_E$ is also determined for each law of variation. We obtain $a_v(z_E)=1.85$ mm and $R_v(z_E)=5.14$ mm.

Next, a physical interaction effect between the tyre and the pavement is predicted. In this instance, the rolling noise B of the tyre on the pavement 12 is predicted on the basis of a law for predicting the noise B of the type $B=g(V_1, \ldots, V_n)$ in which $V_1, \ldots, V_n$ are values of descriptors $D_1, \ldots, D_n$ of the pavement.

In the first embodiment, n=2, $D_1$ is a characteristic number of indenters of the pavement 12 and $D_2$ is a characteristic dimension of indenters of the pavement 12. In the example illustrated, the characteristic number of indenters is the interaction value $N_{R,E}$ of the number of real indenters 12 per unit area of the pavement 12 and the characteristic dimension of indenters is the interaction value $R_v(z_E)$ of the radius of the virtual spheres 32.

In this embodiment, the noise B is predicted on the basis of a rolling noise B prediction law defined by:

$$B = 20\log\left[\left(\frac{R_v(z_E)}{Ro}\right)^{\frac{1}{5}} \left(\frac{No}{N_{R,E}}\right)^{\frac{3}{5}} \left(\frac{C}{Co}\right)^k \left(\frac{0.75}{1-v^2} \frac{E}{Eo}\right)^{\frac{1}{5}}\right] + Bo \quad \text{(equation 1)}$$

in which C is the rolling speed of the tyre, v is the Poisson's ratio of the rubber and E the stiffness modulus of the rubber, Bo is a reference rolling noise for a reference tyre with stiffness modulus Eo rolling at the reference speed Co over a reference pavement with reference virtual descriptors Ro and No. k belongs to the interval [1.2-2]. Preferably, k=1.6. As a variant, k=1.2. In another variant, k=2. Bo depends on the location at which the measurement is carried out: inside the vehicle bearing the tyre, at the edge of a track paved with the pavement, etc.

In a second embodiment, n, $D_1$ and $D_2$ are identical to the first embodiment. The noise B is predicted on the basis of a rolling noise B prediction law defined by:

$$B = 20\log\left[\left(\frac{R_v(z_E)}{Ro}\right)^{\frac{1}{5}}\left(\frac{No}{N_{R,E}}\right)^{\frac{3}{5}}\left(\frac{C}{Co}\right)^k\right] + Bo' \quad \text{(equation 2)}$$

When a reference tyre is used to compare several different pavements, the stiffness modulus E and Poisson's ratio v of the rubber are known and are included in the reference constant Bo'. k belongs to the interval [1.2-2]. Preferably, k=1.6. As a variant, k=1.2. In another variant, k=2.

In a third embodiment, having regard to the negligible influence of the descriptor $R_v$ with respect to the other descriptors for certain types of pavements, the rolling noise B of a given tyre is predicted on the basis of a rolling noise B prediction law defined by:

$$B = 20\log\left[\left(\frac{No}{N_{R,E}}\right)^{\frac{3}{5}}\left(\frac{C}{Co}\right)^k\right] + Bo'' \quad \text{(equation 3)}$$

In this embodiment n=1 and $D_1$, the characteristic number of indenters of the pavement, is the only descriptor used. k belongs to the interval [1.2-2]. Preferably, k=1.6. As a variant, k=1.2. In another variant, k=2. Small discrepancies are generally observed between the noise B as predicted by equations 2 and 3.

In a fourth embodiment, the rolling noise B of an arbitrary tyre is predicted on the basis of a rolling noise B prediction law defined by:

$$B = 20\log\left[\left(\frac{No}{N_{R,E}}\right)^{\frac{3}{5}}\left(\frac{C}{Co}\right)^k\left(\frac{0.75}{1-v^2}\frac{E}{Eo}\right)^{\frac{1}{5}}\right] + Bo''' \quad \text{(equation 4)}$$

In this embodiment n=1 and $D_1$, the characteristic number of indenters of the pavement, is the only descriptor used. k belongs to the interval [1.2-2]. Preferably, k=1.6. As a variant, k=1.2. In another variant, k=2.

In a fifth embodiment, the rolling noise B of a given tyre is predicted on the basis of a rolling noise B prediction law defined by:

$$B = 20\log\left[\left(\frac{R_v(z_E)}{Ro}\right)^{\frac{1}{5}}\left(\frac{No}{N_{R,E}}\right)^{\frac{3}{5}}\right] + Bo'''' \quad \text{(equation 5)}$$

This relation makes it possible to obtain a good prediction, taking account solely of the characteristics of the pavement. Indeed, the law takes account of $R_v(z_E)$ which, although exhibiting a lower mathematical weight than $N_{R,E}$, makes it possible to indirectly describe characteristics of the method for manufacturing the pavement such as the nature of the rock, the influence of the mode of crushing. This relation also makes it possible to understand how a modification of the characteristics of the method for manufacturing the pavement modifies the rolling noise.

Example of Predicting the Rolling Noise B for a Given Sculpted Tyre.

Trials have been performed with a sculpted tyre on various pavements T1-T4. The descriptors $N_{R,E}$ and $R_v(z_E)$ for each of these pavements have been determined according to the method according to the invention. The real profile of a sample of 1 m of each pavement T1-T4 is acquired by means of a laser profilometer whose spatial resolutions are dx=0.1 mm along the X axis and dz=0.01 mm along the Z axis. The prediction law of the second embodiment (equation 2) is used, with a value Bo'=45 dB. This value of Bo' corresponds to an experimental average generally measured, outside the vehicle, for a passenger vehicle tyre.

A given vehicle is driven at 60 km/h over each pavement T1-T4. The noise is then measured at three different locations: in proximity to the tyre, inside the vehicle and outside the vehicle as the latter passes by (also called coast-by noise). The results are given in table 1 hereinbelow.

TABLE 1

| Pavement | $N_{R,E}$ (indenters/m²) | $R_v(z_E)$ (mm) | B predicted by equation 2 (dB) | B measured in proximity to the tyre (dB) | B measured outside the vehicle (dB) | B measured inside the vehicle (dB) |
|---|---|---|---|---|---|---|
| T1 | 4131 | 3.6 | 71.8 | 103.5 | 69.2 | 66.6 |
| T2 | 6911 | 4.8 | 69.6 | 103.5 | 66.6 | 63.7 |
| T3 | 19509 | 7.51 | 65.0 | 102 | 61.8 | 59.3 |
| T4 | 28233 | 3.74 | 61.9 | 95.7 | 55.4 | 56.3 |

For the noise measured in proximity to the tyre, the following correlation $B_{measured}=0.73 \times B_{predicted}+52$ is obtained, with a correlation coefficient $R^2=0.8$.

For the noise measured outside the vehicle, the following correlation $B_{measured}=1.26 \times B_{predicted}-21.40$ is obtained, with a correlation coefficient $R^2=0.96$.

For the noise measured inside the vehicle, the following correlation $B_{measured}=1.23 \times B_{predicted}-22.10$ is obtained, with a correlation coefficient $R^2=0.97$.

It is noted that the experimental value $B_{measured}$ may be approximated more accurately by correcting the value of Bo' as a function of the measurement location.

Whatever the measurement location, the correlation between the prediction model and the measurements performed is very satisfactory and makes it possible to compare and predict, on the basis of sample of one or more pavements, the noise B arising from the rolling of a given tyre.

Example of Predicting the Rolling Noise B for a Given Smooth Tyre.

In order to characterize the roughness of the road without interaction with the sculpture of the tyre, a smooth tyre is used. Trials are performed on various pavements R1-R6 illustrating the diversity of the pavements of the road network. The descriptors $N_{R,E}$ and $R_v(z_E)$ for each of these pavements have been determined according to the method according to the invention. The real profile of a sample of 1.7 m of a given pavement is acquired by means of a laser profilometer whose spatial resolutions are dx=0.4 mm along the X axis and dz=0.01 mm along the Z axis. The prediction laws of the second and third embodiments (equations 2 and 3) are used, with a value Bo'=Bo"=45 dB.

A given vehicle is driven at 60 km/h on each pavement R1-R6. Several experimental measurements of the noise in proximity to the tyre are carried out and the experimental measurements for each pavement R1-R6 are averaged. The results are given in table 2 hereinbelow.

TABLE 2

| Pavements | $N_{R,E}$ (indenters/ m$^2$) | $R_v(z_E)$ (mm) | B measured (dB) | B predicted according to equation 2 (dB) | B predicted according to equation 3 (dB) |
| --- | --- | --- | --- | --- | --- |
| R1 | 27128 | 6.1 | 84.9 | 82.9 | 83.8 |
| R2 | 18021 | 4.74 | 85.4 | 84.6 | 85.9 |
| R3 | 15028 | 4.66 | 86.9 | 85.6 | 86.9 |
| R4 | 19884 | 8.66 | 86.0 | 85.2 | 85.4 |
| R5 | 13922 | 5.77 | 87.1 | 86.3 | 87.3 |
| R6 | 5751 | 3.40 | 92.1 | 90.0 | 91.9 |

On the one hand, it is noted that the prediction of the rolling noise B for the set of pavements R1-R6 is excellent, thereby confirming the relevance of the chosen descriptors but also the aptness of the rolling noise B prediction law for very different pavements.

Moreover, it is noted that the value of the noise B predicted by means of the law according to the third embodiment is greater than the value of the noise B predicted by means of the law according to the second embodiment. Within the framework of this example, the law according to the third embodiment makes it possible to obtain predicted values for noise B that are closer to the experimental values than does the law according to the second embodiment.

Finally, it is noted that the accuracy of the predicted noise B is greater than that in the previous example.

All or part of the method according to the invention may be implemented by way of code instructions able to control the execution of the steps of the method when it is executed on a computer. The instructions may emanate from computer programs recorded on a medium for recording data for example of the hard disc or flash memory, CD or DVD type. Provision may be made to make such a program available with a view to its downloading on a telecommunication network such as the Internet network or a wireless network. It will thus be possible for updates of the program to be sent via this network to the computers connected to the network.

The invention claimed is:

1. A pavement design method based on a prediction of a rolling noise B of a tyre on a roadway pavement, the method comprising steps of:
    obtaining a measurement of a surface of the pavement, the measurement providing data of a real profile of the pavement;
    filtering the data of the real profile, using a computer, to extract pavement descriptors N and R, in which:
        N is a value of a characteristic number of indenters per unit area of the pavement, and
        R is a value of a characteristic dimension of indenters of the pavement;
    calculating the prediction of the rolling noise B of the tyre, using the computer, by utilizing information extracted in the filtering step in a law given by:

$$B = 20\log\left[\left(\frac{R}{Ro}\right)^{\frac{1}{5}}\left(\frac{No}{N}\right)^{\frac{3}{5}}\left(\frac{C}{Co}\right)^{k}\left(\frac{0.75}{1-v^2}\frac{E}{Eo}\right)^{\frac{1}{5}}\right] + Bo,$$

in which
    C is a rolling speed of the tyre,
    E is a stiffness modulus of a rubber of the tyre,
    v is a Poisson's ratio of the rubber of the tyre,
    k is a value in an interval from 1.2 to 2, and
    Ro, No, Co, Eo, and Bo are reference values; and
utilizing the prediction of the rolling noise B of the tyre calculated in the calculating step to modify a process for manufacturing pavement.

2. The method according to claim 1, wherein:
    at least one law of variation of at least one pavement descriptor is determined based on the real profile, as a function of a variable parameter of the real profile,
    an interaction value of each of the at least one pavement descriptor is determined at an interaction value of the variable parameter, for each law of variation, and
    a value of the prediction of the rolling noise B of the tyre is calculated based on an interaction value of the at least one pavement descriptor.

3. The method according to claim 2, wherein the real profile is sectioned into plural strata, each stratum corresponding to an altitude of the real profile, such that:
    the law of variation of each of the at least one pavement descriptor is determined as a function of an altitude of the real profile,
    the at least one pavement descriptor includes at least one virtual pavement descriptor, and
    the interaction value of each of the at least one virtual pavement descriptor is determined at an interaction value of the altitude, for the law of variation of each of the at least one pavement descriptor.

4. The method according to claim 1, wherein:
    the at least one pavement descriptor includes at least one real pavement descriptor of indenters of the pavement,
    the method includes a step of determining an interaction value of each of the at least one real pavement descriptor, and
    a value of the prediction of the rolling noise B the tyre is calculated based on an interaction value of the at least one real pavement descriptor.

5. The method according to claim 4, wherein, the at least one real pavement descriptor includes a number of real indenters per unit area of the pavement, in which a value N is an interaction value of the number of real indenters per unit area of the pavement.

6. The method according to claim 5, wherein the interaction value of the number of real indenters per unit area of the pavement is a maximum value of a law of variation of the number of real indenters per unit area of the pavement.

7. The method according to claim 4, wherein:
    the at least one real descriptor includes at least one virtual pavement descriptor of virtual indenters of the pavement for modelling real indenters of the pavement;
    an interaction value of each of the at least one virtual pavement descriptor is determined based on:
        a law of interaction between the tyre and the pavement, and
        a law of variation of the virtual indenters of the pavement, and
    a value of the prediction of the rolling noise B of the tyre is calculated based on an interaction value of the at least one virtual pavement descriptor.

8. The method according to claim 7, wherein
the virtual indenters of the pavement are represented by identical spheres for each value of a variable parameter,
the at least one virtual pavement descriptor includes a radius of the spheres, and
a value of N is an interaction value of the radius of the spheres.

9. The method according to claim 1, wherein the method is performed using a computer program with code instructions executed on a computer.

10. A pavement design method based on a prediction of a rolling noise B of a tyre on a roadway pavement, the method comprising steps of:
obtaining a measurement of a surface of the pavement, the measurement providing data of a real profile of the pavement;
filtering the data of the real profile, using a computer, to extract pavement descriptors N and R, in which:
N is a value of a characteristic number of indenters per unit area of the pavement, and
R is a value of a characteristic dimension of indenters of the pavement;
calculating the prediction of the rolling noise B of the tyre, using the computer, by utilizing information extracted in the filtering step in a law given by:

$$B = 20\log\left[\left(\frac{R}{Ro}\right)^{\frac{1}{5}}\left(\frac{No}{N}\right)^{\frac{3}{5}}\left(\frac{C}{Co}\right)^{k}\right] + Bo',$$

in which
C is a rolling speed of the tyre,
k is a value in an interval from 1.2 to 2, and
Ro, No, Co, and Bo' are reference values; and
utilizing the prediction of the rolling noise B of the tyre calculated in the calculating step to modify a process for manufacturing pavement.

11. A pavement design method based on a prediction of a rolling noise B of a tyre on a roadway pavement, the method comprising steps of:
obtaining a measurement of a surface of the pavement, the measurement providing data of a real profile of the pavement;
filtering the data of the real profile, using a computer, to extract a pavement descriptor N, in which N is a value of a characteristic number of indenters per unit area of the pavement;
calculating the prediction of the rolling noise B of the tyre, using the computer, by utilizing information extracted in the filtering step in a law given by:

$$B = 20\log\left[\left(\frac{No}{N}\right)^{\frac{3}{5}}\left(\frac{C}{Co}\right)^{k}\right] + Bo'',$$

in which
C is a rolling speed of the tyre,
k is a value in an interval from 1.2 to 2, and
No, Co, and Bo'' are reference values; and
utilizing the prediction of the rolling noise B of the tyre calculated in the calculating step to modify a process for manufacturing pavement.

12. A pavement design method based on a prediction of a rolling noise B of a tyre on a roadway pavement, the method comprising steps of:
obtaining a measurement of a surface of the pavement, the measurement providing data of a real profile of the pavement;
filtering the data of the real profile, using a computer, to extract a pavement descriptor N, in which N is a value of a characteristic number of indenters per unit area of the pavement;
calculating the prediction of the rolling noise B of the tyre, using the computer, by utilizing information extracted in the filtering step in a law given by:

$$B = 20\log\left[\left(\frac{No}{N}\right)^{\frac{3}{5}}\left(\frac{C}{Co}\right)^{k}\left(\frac{0.75}{1-v^2}\frac{E}{Eo}\right)^{\frac{1}{5}}\right] + Bo''',$$

in which
C is a rolling speed of the tyre,
E is a stiffness modulus of a rubber of the tyre,
v is a Poisson's ratio of the rubber of the tyre,
k is a value in an interval from 1.2 to 2, and
No, Co, Eo and Bo''' are reference values; and
utilizing the prediction of the rolling noise B of the tyre calculated in the calculating step to modify a process for manufacturing pavement.

13. A pavement design method based on a prediction of a rolling noise B of a tyre on a roadway pavement, the method comprising steps of:
obtaining a measurement of a surface of the pavement, the measurement providing data of a real profile of the pavement;
filtering the data of the real profile, using a computer, to extract pavement descriptors N and R, in which:
N is a value of a characteristic number of indenters per unit area of the pavement, and
R is a value of a characteristic dimension of indenters of the pavement;
calculating the prediction of the rolling noise B of the tyre, using the computer, by utilizing information extracted in the filtering step in a law given by:

$$B = 20\log\left[\left(\frac{R}{Ro}\right)^{\frac{1}{5}}\left(\frac{No}{N}\right)^{\frac{3}{5}}\right] + Bo'''',$$

in which
Bo'''' is a reference value; and
utilizing the prediction of the rolling noise B of the tyre calculated in the calculating step to modify a process for manufacturing pavement.

14. A non-transitory computer-readable recording medium storing code instructions that, when executed by a computer, causes the computer to perform a pavement design method based on a prediction of a rolling noise B of a tyre on a roadway pavement, the method comprising steps of:
filtering data of a real profile of the pavement, the data being obtained by measurement of a surface of the pavement, to extract pavement descriptors N and R, in which:
N is a value of a characteristic number of indenters per unit area of the pavement, and
R is a value of a characteristic dimension of indenters of the pavement;
calculating the prediction of the rolling noise B of the tyre by utilizing information extracted in the filtering of the data in a law given by:

$$B = 20\log\left[\left(\frac{R}{Ro}\right)^{\frac{1}{5}}\left(\frac{No}{N}\right)^{\frac{3}{5}}\left(\frac{C}{Co}\right)^{k}\left(\frac{0.75}{1-v^2}\frac{E}{Eo}\right)^{\frac{1}{5}}\right] + Bo,$$

in which
C is a rolling speed of the tyre,
E is a stiffness modulus of a rubber of the tyre,
v is a Poisson's ratio of the rubber of the tyre,
k is a value in an interval from 1.2 to 2, and
Ro, No, Co, Eo, and Bo are reference values; and
utilizing the prediction of the rolling noise B of the tyre, as calculated in the calculating of the prediction of the rolling noise B of the tyre, to modify a process for manufacturing pavement.

15. A pavement design method based on a prediction of a rolling noise B of a tyre on a roadway pavement, the method comprising steps of:
installing, on a first computer connected to a telecommunications network, computer code that includes:
filtering data of a real profile of the pavement, the data being obtained by measurement of a surface of the pavement, to extract pavement descriptors N and R, in which:
N is a value of a characteristic number of indenters per unit area of the pavement, and
R is a value of a characteristic dimension of indenters of the pavement;
calculating the prediction of the rolling noise B of the tyre by utilizing information extracted by the computer code for the filtering of the data in a law given by:

$$B = 20\log\left[\left(\frac{R}{Ro}\right)^{\frac{1}{5}}\left(\frac{No}{N}\right)^{\frac{3}{5}}\left(\frac{C}{Co}\right)^{k}\left(\frac{0.75}{1-v^2}\frac{E}{Eo}\right)^{\frac{1}{5}}\right] + Bo,$$

in which
C is a rolling speed of the tyre,
E is a stiffness modulus of a rubber of the tyre,
v is a Poisson's ratio of the rubber of the tyre,
k is a value in an interval from 1.2 to 2, and
Ro, No, Co, Eo, and Bo are reference values;
enabling the computer code to be downloaded by a second computer connected to the telecommunications network; and
utilizing the prediction of the rolling noise B of the tyre, as calculated by the computer code for the calculating of the prediction of the rolling noise B of the tyre, to modify a process for manufacturing pavement.

\* \* \* \* \*